United States Patent [19]

Hinger

[11] Patent Number: 5,309,947
[45] Date of Patent: May 10, 1994

[54] APPARATUS FOR LINING AN INSIDE WALL OF A SEWER PIPE

[75] Inventor: Klaus-Jürgen Hinger, Stuttgart, Fed. Rep. of Germany

[73] Assignee: Werner & Pfleiderer, GmbH, Fed. Rep. of Germany

[21] Appl. No.: 888,340

[22] Filed: May 22, 1992

[30] Foreign Application Priority Data

Jun. 11, 1991 [DE] Fed. Rep. of Germany ....... 4119161

[51] Int. Cl.$^5$ ............................................. F16L 55/162
[52] U.S. Cl. .......................................... 138/98; 138/97; 118/306; 405/150.1; 425/97; 425/104
[58] Field of Search ................... 138/97, 98; 118/306; 405/150.1, 150.2, 154; 425/94, 97, 104, 113, 208

[56] References Cited

U.S. PATENT DOCUMENTS

| | | | |
|---|---|---|---|
| 2,090,851 | 8/1937 | Perkins | 118/306 |
| 2,352,768 | 7/1944 | Brend | 118/306 |
| 2,575,353 | 11/1951 | MacEvoy | 118/306 |
| 2,910,042 | 10/1959 | Gallmeyer et al. | 118/306 |
| 3,037,228 | 6/1962 | Cummings | 118/306 |
| 3,333,311 | 8/1967 | Matheny et al. | 118/306 |
| 3,753,766 | 8/1973 | Brown et al. | 138/97 |
| 3,895,604 | 7/1975 | Ryan | 118/306 |
| 4,329,937 | 5/1982 | Holland | 118/306 |
| 4,529,008 | 7/1985 | Appleton | 138/97 |
| 4,950,356 | 8/1990 | Grace | 138/97 |

FOREIGN PATENT DOCUMENTS

| | | | |
|---|---|---|---|
| 3627556 | 2/1988 | Fed. Rep. of Germany . | |
| 3931775 | 4/1991 | Fed. Rep. of Germany . | |
| 4031741 | 6/1991 | Fed. Rep. of Germany . | |
| 2579294 | 9/1986 | France . | |
| 635096 | 4/1950 | United Kingdom | 118/306 |
| 2133497 | 7/1984 | United Kingdom . | |
| 2218773 | 11/1989 | United Kingdom | 138/97 |

OTHER PUBLICATIONS

Stein and Niederehe, "Instandhaltung von Kanalisationen" (Sewerage System Maintenance), Ernst & Sohn Verlag, Berlin 1987, pp. 308-317.

*Primary Examiner*—Harvey C. Hornsby
*Assistant Examiner*—Mark Spisich
*Attorney, Agent, or Firm*—Laff, Whitesel, Conte & Saret

[57] ABSTRACT

An extruder drivable for displacement by moving devices is provided for sewer pipe reconstruction and has a radial nozzle applying by extrusion a thermoplastic tube to the inside wall of a sewer pipe to be reconstructed. The thermoplastic tube is pressed against the inside wall by pressurized air and cooled down to form a lining pipe.

18 Claims, 6 Drawing Sheets

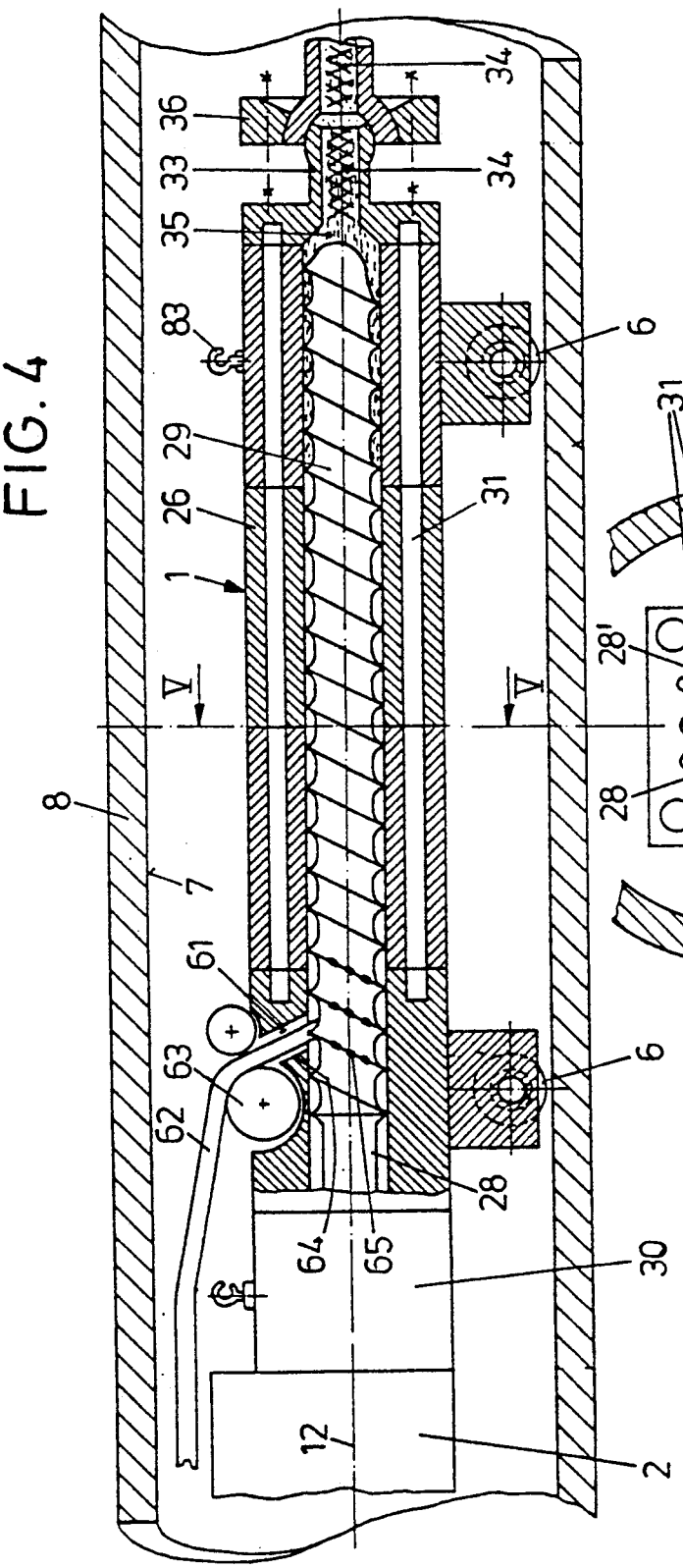
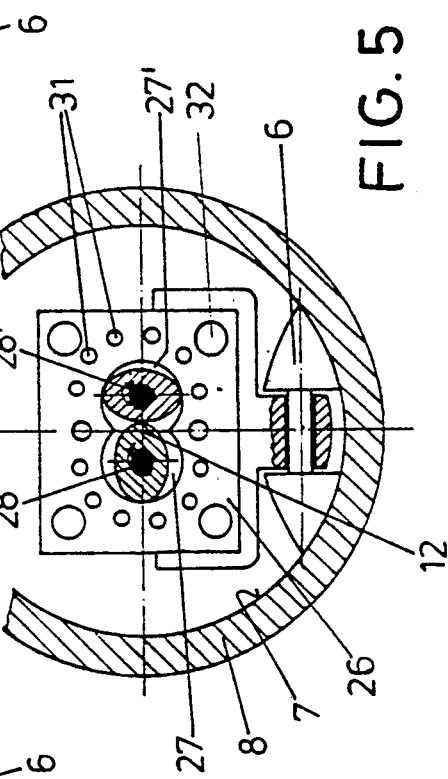

APPARATUS FOR LINING AN INSIDE WALL OF A SEWER PIPE

FIELD OF THE INVENTION

The invention relates to a method of lining an inside wall of a sewer pipe and to an apparatus for lining an inside wall of a sewer pipe.

BACKGROUND OF THE INVENTION

The public sewerage system is out of repair and leaking to a considerable extent, namely of approximately 15 to 20 per cent. This causes considerable pollution, in particular of ground water and drinking water. Repair of these damages requires great efforts.

The book of Stein and Niederehe, "Instandhaltung von Kanalisationen" (Sewerage System Maintenance), Ernst & Sohn Verlag, Berlin 1987, pages 308 to 317, discloses numerous methods of repairing or reconstructing damaged sewer pipes that consist in sealing the sewer pipes located in the ground.

The so-called injection method consists in sealing leaking pipe connections by an injection of acrylic resins into the pipe. In another sealing method gaskets are manually inserted into the sewer pipe and pressed against the inside wall of the sewer pipe by means of steel pressing rings. A relining method consists in that a defined annular space is produced with the aid of reusable tube formwork provided with spacers and in that cement mortar is pressed into this space. In a further lining method cement mortar is placed between a pressure piston and a displacement body. When this device is pulled through the sewer pipe, the mortar is pressed against the pipe wall by the displacement body. In a further relining method the relining material is centrifuged towards the inside wall of the sewer pipe by a centrifugal head rotating at high speed.

So-called pipe-line relining consists in a plastic pipe being introduced into the sewer pipe to be reconstructed, which reduces the pipe cross-section considerably. The remaining annular space is filled. Excavations are necessary where break-throughs have to be produced in the continuous plastic pipe for house or street connections.

In the method of so-called short-pipe lining short single pipes are individually entered via an inspection pit into a sewer pipe to be repaired. This also reduces the sewer cross-section. The remaining annular space is filled as a rule. Excavations are necessary to produce house or street connections.

In the so-called wrapped-tube relining method wrapped tubes produced at site from plastic profile strips are entered into the sewer pipe to be repaired. The annular space is filled as a rule.

The so-called hose relining consists in that a prefabricated felt hose soaked with synthetic resin is introduced into the sewer line to be repaired and is pressed to the inside wall of the sewer pipe by internal pressure. Curing is effected in situ by heat supply. House and street connections must be cleared by milling.

SUMMARY OF THE INVENTION

It is an object of the invention to create a method of the generic type, by means of which lining of a damaged sewer pipe can be attained in as simple a manner as possible together with the slightest possible reduction in diameter of the lined sewer pipe, and to embody an apparatus to put this method into practice.

In a method of the generic type this object is attained by plastic material being melted and progressively moulded to form a thermoplastic tube, which is pressed against the inside wall, where it is cooled down to form a lining pipe. By the method according to the invention a plastic pipe is directly melted onto the inside wall of the sewer pipe to be repaired located in the ground. The plastic pipe is produced in situ. This serves to repair not only damaged pipes, for instance cracks and breaks in the pipe and leaking pipe bells; the plastic pipe also has a high reinforcing effect, i.e. it also assumes the supporting function of the pipe. Over-ground road traffic is not perceptibly affected by the reconstruction work. Sewer pipes of reinforced concrete get an increased resistance to corrosion and erosion. Sewage flow is ameliorated due to the high surface smoothness inside the plastic pipe. The diameter of the sewer pipe to be repaired is reduced only by the wall thickness of the relining pipe. This is why the method according to the invention can be repeated several times. It can also be used for more serious damages such as pipe fracture, misalignment, displacement. The thermoplastic tube subsequently curing to form a relining pipe is applied to the inside wall of the sewer pipe by extrusion, an intensive connection with the inside wall of the sewer pipe being attained during simultaneous and subsequent cooling by the plastic tube being pressed against the inside wall of the sewer pipe by means of a pressure jet acting on an internal surface of the plastic tube and cooling it down. The measures according to which the inside wall of the sewer pipe is at least partially dried prior to the plastic tube being applied and the inside wall is dried by hot air, ameliorate the adhesion of the tube and thus of the relining pipe to the inside wall of the sewer pipe. The further development according to which the extrusion of the plastic tube is interrupted where a joining pipe branches off the sewer pipe, is a simple way of providing recesses for house or street connections so that no further processing is necessary.

The object on which the invention is based is attained in an apparatus of the generic type by an extruder with a central longitudinal axis being provided, which extruder has a nozzle radially directed to said central longitudinal axis, which nozzle is provided for extrusion of a plastic tube, and which extruder is drivable for displacement in an operating direction with moving devices supported on the inside wall of the sewer pipe. The method according to the invention can consequently be realized by means of an extruder independently displaceable in a sewer pipe, there being the possibility to provide moving devices formed on a feed unit which is independent of and to be coupled to the extruder. The further development according to which—referred to the operating direction—at least one radial pipe moulding and cooling nozzle is arranged downstream of the nozzle and according to which the at least one pipe moulding and cooling nozzle is connected to a supply for a high-pressure medium, in particular pressurized air, is a simple way of ensuring that the extruded plastic tube is pressed tightly against the inside wall of the sewer pipe, where it is cooled down to form a relining pipe. When—referred to the operating direction—the nozzle is preceded by at least one hot-air nozzle directed towards the inside wall of the sewer pipe at least substantially radially in relation to the central longitudinal axis, pre-drying and pre-heating of the inside wall of the sewer pipe is realized in a very simple way, this drying and pre-heating possibly being effected by the pressurized air serving for granule conveyance.

The further embodiment according to which the nozzle has an annular radial nozzle gap adjustable in width, results in that the relining tube may have different wall thicknesses depending on what is needed, the particularly advantageous embodiment according to which along its circumference and in sections the radial nozzle gap is adjustable in width, ensuring that the wall thicknesses can also be made to vary along the circumference, i.e. the relining pipe may have an additional thickening in the vicinity of breaks or the like.

The measures according to which the moving devices are adjustable radially in relation to the axis and in particular according to which the moving devices are supported radially in relation to said central longitudinal axis and against a housing by way of at least one spring in each case, are provided in order that the apparatus according to the invention can be used for sewer pipes of different diameters to be repaired. The further development according to which the moving devices are motor-drivable, ensures that the apparatus is independent also with regard to its drive. The embodiment of the moving devices according to which the moving devices are in the form of crawler tracks, is particularly advantageous with a view to the rough surfaces of the sewer pipes.

The supply of the extruder with plastic material advantageously takes place by way of a plastic tape supplied to the extruder, which has a feed opening matching the plastic tape. The further development according to which downstream of the feed opening the extruder has screw elements with cutting teeth, is suitable in order that the tape can be granulated. If the extruder is fed with plastic material granules, the latter are advantageously conveyed pneumatically in the pressurized-air line to the feed opening. Granules and air can be separated in the feed section of the screws by reverse degasification.

A survey of the interior of the sewer pipe to be repaired and control of the operations to be performed can be obtained in a particularly simple way by the further development according to which the apparatus is provided with at least one television camera. The measures according to which a detachable driving-motor unit is coupled to the extruder, are provided in order that the apparatus can be entered into a sewer pipe even through comparatively narrow inspection pits.

The further development according to which the nozzle is formed to be closable by means of a closing device, ensures that the extrusion of a tube can be completely interrupted for a short time at house or street connections or to form a recess in the plastic tube.

Further details, advantages and features of the invention will become apparent from the ensuing description of an example of embodiment taken in conjunction with the drawing.

BRIEF DESCRIPTION OF THE DRAWING

FIG. 4 is a partial longitudinal section through an extruder of the apparatus, FIG. 5 is a cross-section through the extruder according to the section line V—V in FIG. 4.

DESCRIPTION OF THE PREFERRED EMBODIMENT

Figure 1:
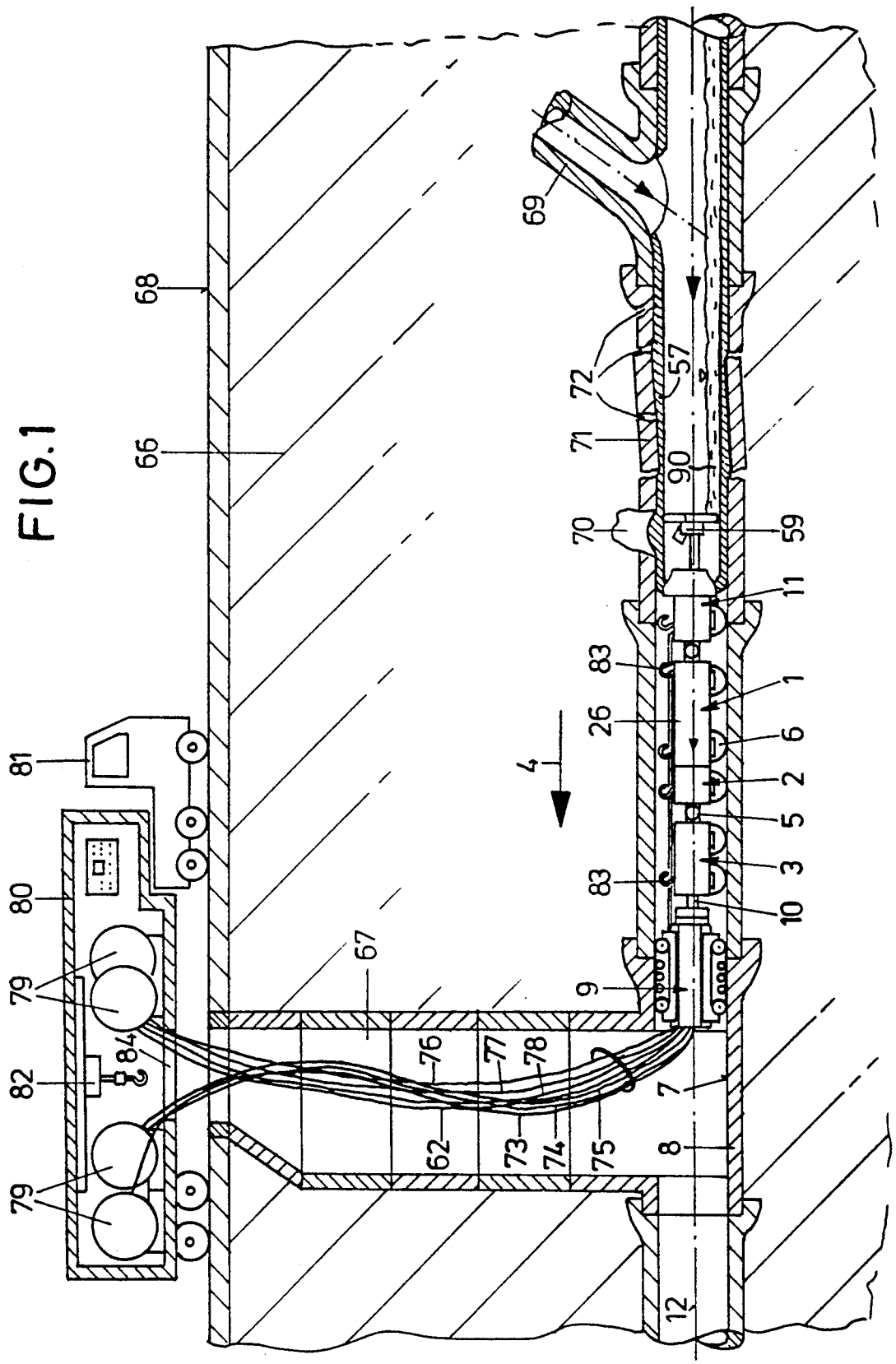
FIG. 1 shows a sewer pipe to be repaired with an apparatus according to the invention in an illustration mainly broken open.

As in particular seen in FIG. 1—the apparatus illustrated in the drawing has a twin-shaft extruder 1 preceded in the operating direction 4 by an extruder driving motor 3 in the form of a hydraulic motor with a transmission 2 being interconnected. Whereas the transmission 2 is firmly flanged to the extruder 1, the driving motor 3 is coupled to the extruder 1 by means of a shaft coupling 5. The extruder 1, the transmission 2 and the driving motor 3 are formed as a displaceable unit, i.e. they can bear against the inside wall 7 of a sewer pipe by means of rollers 6. In the operating direction 4 the driving motor 3 is preceded by a feed unit 9 connected with the driving motor 3 by a trailer coupling 10. The extruder 1, the transmission 2 and the driving motor 3 are formed as spatially independent units so as to assure assembly and dismounting under the confined circumstances within a sewer pipe 8. The same is true for a nozzle 11 arranged downstream of the extruder 1 in the operating direction 4 equally bearing against the inside wall 7 of the sewer pipe 8 by means of rollers 6. At least the extruder 1, the nozzle 11 and the feed unit 9 are arranged concentrically of the central longitudinal axis 12 of the sewer pipe 8.

Figure 2:
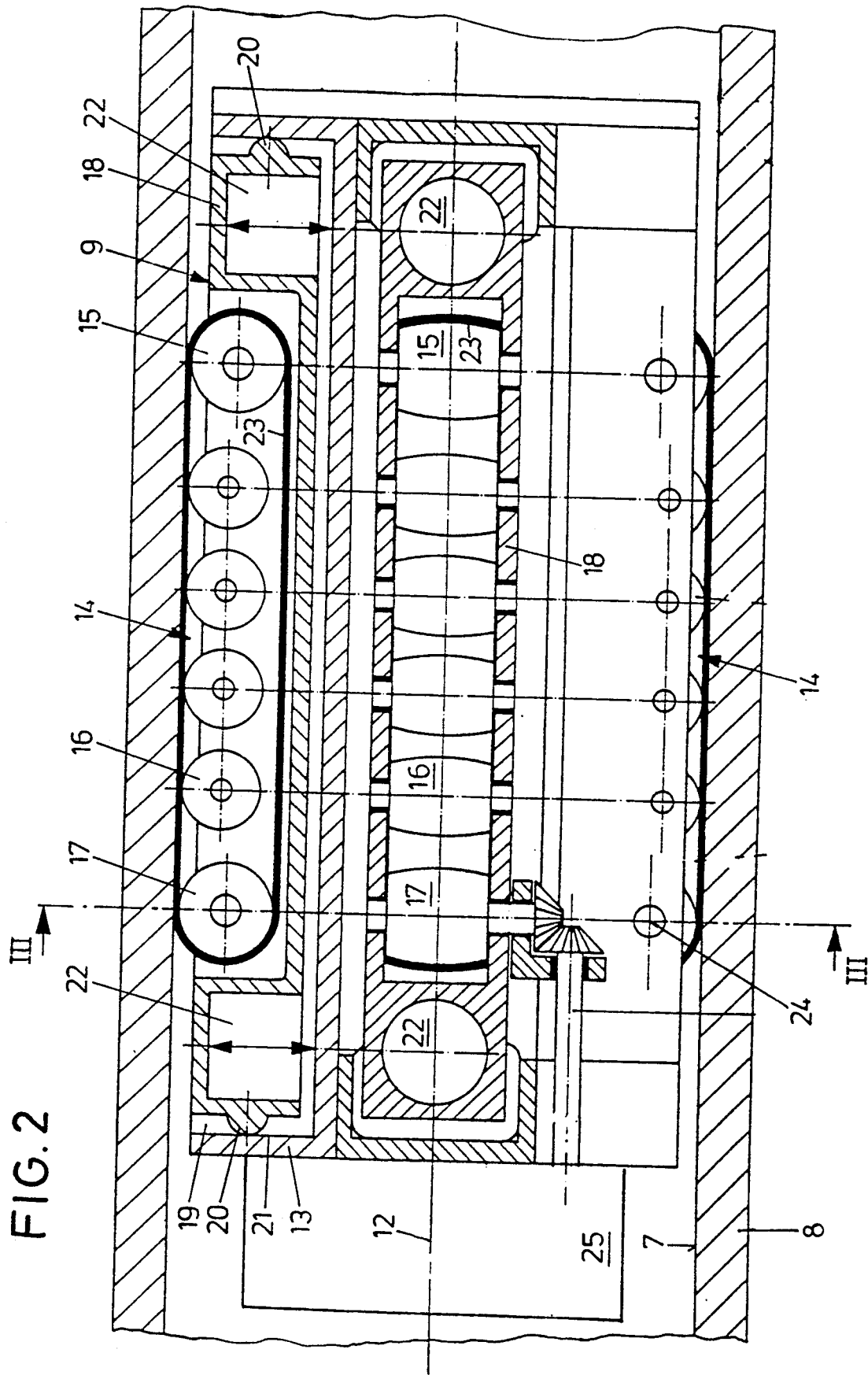
FIG. 2 is a partial longitudinal section through a feed unit of the apparatus, in particular through the latter's moving devices.
Figure 3:
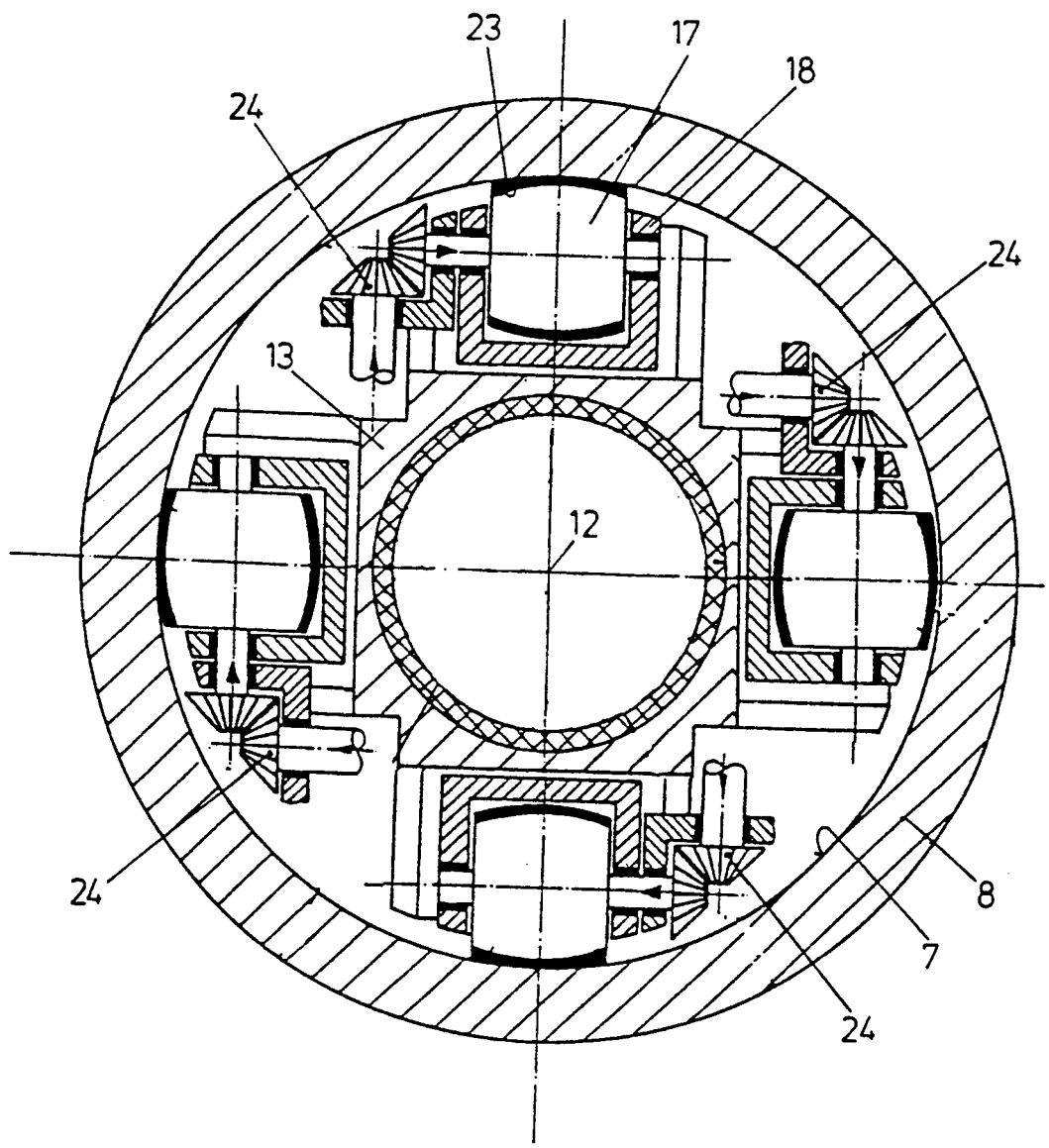
FIG. 3 is a cross-section through the moving devices of the feed unit according to the section line III—III in FIG. 2.

As seen in FIGS. 2 and 3, the feed unit 9 has a housing 13, to which are applied four crawler tracks 14 having a deflection pulley 15, several travelling pulleys 16 and a drive pulley 17 arranged one behind the other referred to the axis 12 and seen in the operating direction 4 and being supported in a carrier 18 of approximately U-shaped cross-section. This carrier 18 is supported in a groove-shaped accommodation 19 suiting its outside cross-section on the external surface of the housing 13 for radial displacement relative to the axis 12. In its longitudinal direction, i.e. in parallel to the axis 12, it bears against guide surfaces 21 of the accommodation 19 by means of runners 20. In the vicinity of both its ends it bears against the housing 13 of the feed unit 9 radially to the axis 12 by means of springs 22, and in particular hydraulic springs. An endless belt 23 or a rubber track, respectively, is wound around the pulleys 15, 16, 17. The drive of the respective drive pulleys 17 takes place through a deflection gearing 24 of a driving motor 25 and formed as a bevel gear drive.

The structure of the extruder 1 can substantially be seen from FIGS. 4 and 5. It has a housing 26, in which two interengaging bores 27, 27' of figure-eight cross-section are arranged. Two screw shafts 28, 28' each with several screw elements 29 are arranged in the bores 27, 27'. They are driven by the driving motor 3 with the transmission 2 in the form of a branching transmission. The transmission 2 is flanged to a radial axial bearing 30 for the screw shafts 28, 28'. The cross-section of the rollers 6 as generally used is also to be seen from FIG. 5. They have an outline matching the curvature of the inside wall 7 of the sewer pipe 8, thus causing centering of the different units such as the extruder 1, the transmission 2, the driving motor 3 and the nozzle 11.

Heating ducts 31 are provided in the housing 26, through which thermo oil is pumped to heat the extruder 1. Moreover, tie rods 32 are arranged in the housing 26, by means of which the housing 26 usually comprising several housing sections is clamped together.

Figure 6:
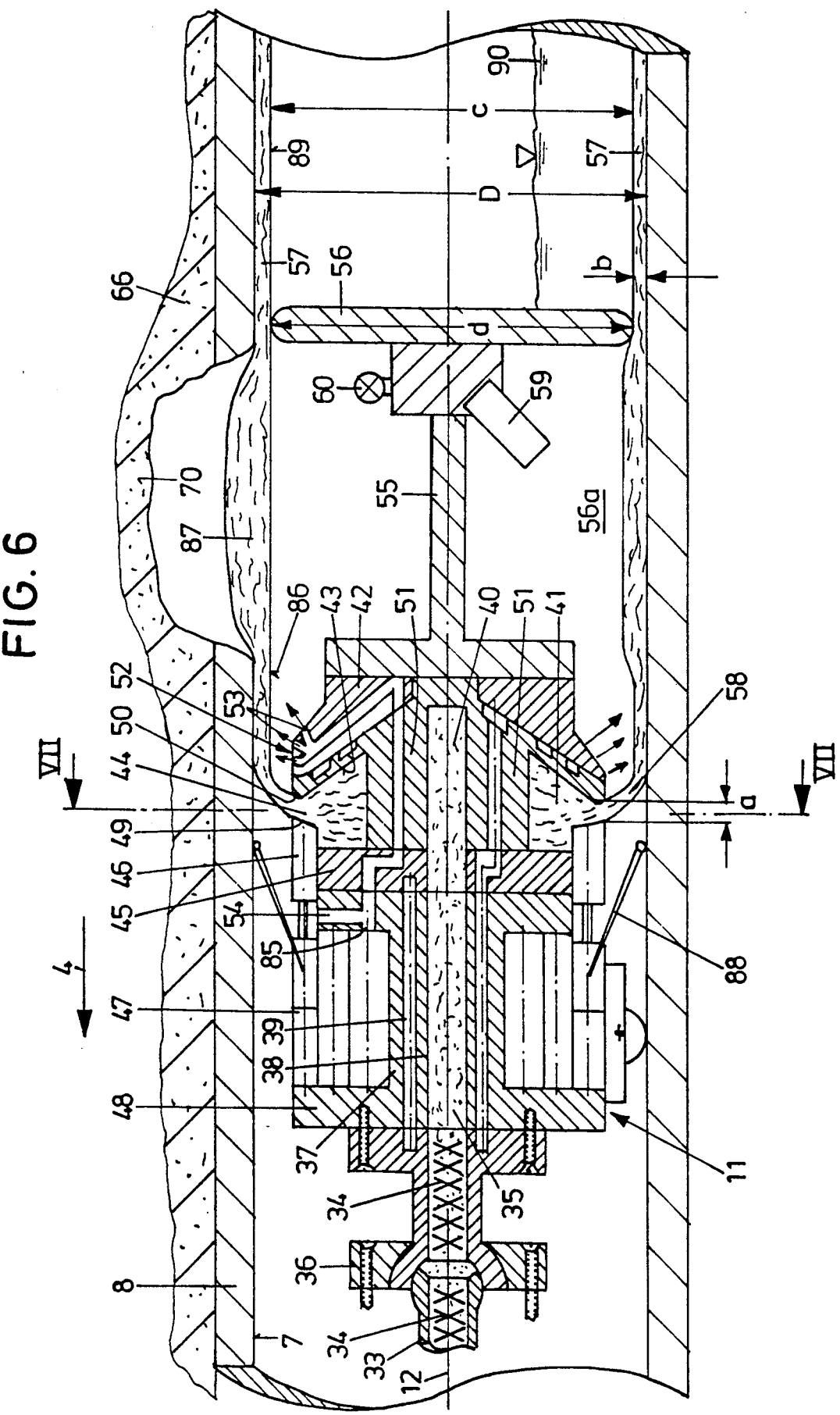
FIG. 6 is a longitudinal section through a nozzle of the apparatus.

As seen in FIG. 4 on the right and in FIG. 6 on the left, the extruder 1 is connected with the nozzle 11 via a plastic melt pipe 33, in which a static mixer 34 is arranged. By means of the static mixer 34 the plastic melt 35 coming from the bores 27, 27' of the extruder 1 is intensively mixed and homogenized. An articulated pipe coupling 36 is formed in the plastic melt pipe 33.

Figure 7:
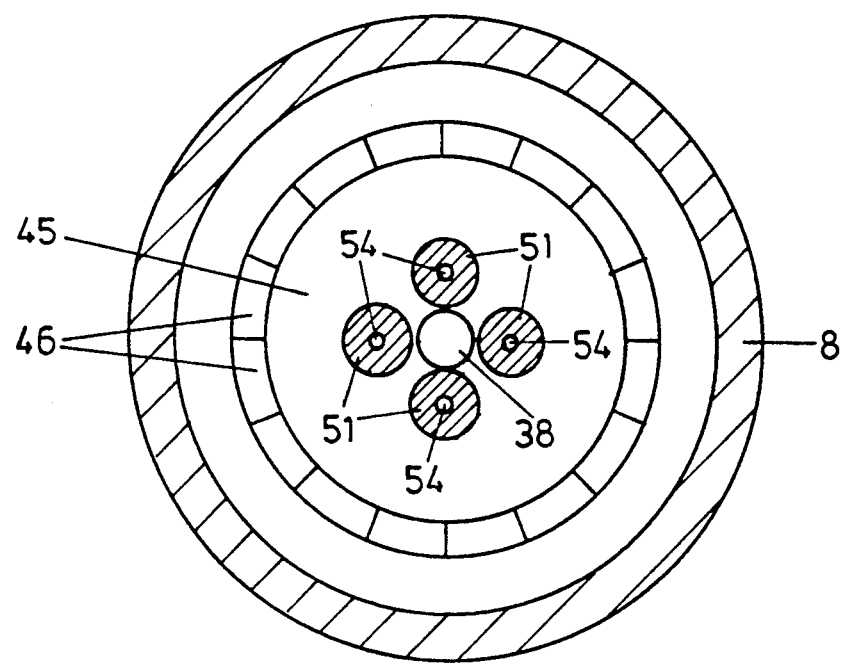
FIG. 7 is a cross-section through the nozzle according to the section line VII—VII in FIG. 6.

As can be taken from FIGS. 6 and 7, the nozzle 11 has a housing 37, in which is formed a plastic melt conduit 38 in alignment with the plastic melt pipe 33 and thus extending concentrically of the axis 12. This conduit 38 is surrounded by heating ducts 39, through which thermo oil is supplied so as to keep the plastic melt 35 liquid. In the vicinity of the discharge end 40 of the nozzle 11 the plastic melt conduit 38 opens into a radial deflection chamber 41 by which it is surrounded. The latter is defined by a front plate 42 with a deflection surface 43 covering the deflection chamber 41 at the front and against the operating direction 4. This deflection surface 43 has the shape of a truncated cone and is arranged concentrically of the axis 12 and opens in the operating direction 4. The plastic melt 35 supplied through the plastic melt conduit 38 is deflected outwards about radially to the axis 12 and guided to the nozzle gap 44 by the deflection surface 43.

Adjacent to the housing 37 of the nozzle 11 the radial deflection chamber 41 is defined by a wall 45 extending radially and provided, in the vicinity of its outer circumference, with numerous nozzle segments 46 arranged to form a ring. By means of positioning devices 47 acting in parallel to the axis 12 these nozzle segments 46 bear against an abutment 48 connected with the housing 37. These positioning devices 47 can be hydraulic, pneumatic or electric linear drives. Adjustable nozzle limiting surfaces 49 are formed on the nozzle segments 46. They are faced by stationary nozzle limiting surfaces 50 formed on the front plate 42 and into which passes the deflection plate 43. As seen in FIG. 7, the front plate 42 with the deflection surface 43 is connected by means of cantilevers 51 with the wall 45 and thus with the housing 37. The width a of the nozzle gap 44 can be set by corresponding adjustment of the nozzle segments 46 parallel to the axis 12. It can thus also be completely closed. Instead of the nozzle segments 46 a cutter ring not shown in the drawing can be provided to be displaceable concentrically of the axis 12 and by means of which the nozzle gap 44 can be closed. Such a cutter ring would produce a plastic tube of uniform thickness all along its circumference without tube recesses being possible.

Downstream of the nozzle gap 44, referred to the operating direction 4, a pipe moulding and cooling device 52 is provided having a pipe moulding and cooling nozzle 53. It is formed as a round nozzle or slit nozzle in the front plate 42 bearing the deflection surface 43 and leads substantially outwards radially to the axis 12. It is connected to high-pressure medium conduits 54 leading through the housing 37 and the cantilevers 51. As a rule pressurized air is used as a high-pressure medium; however, high-pressure water may also be used.

A supporting arm 55 is centrally flanged to the nozzle 11 and extends away from the operating direction 4; the supporting arm 55 bears a partition 56, of which the diameter d equals the diameter D of the sewer pipe 8 minus double the wall thickness b of a plastic pipe 57 to be produced and as the case may be minus some minor play. A pressure chamber 56a is formed by such a partition 56, in which, owing to the high-pressure medium, an overpressure exists that aids in the formation of a plastic tube 58 upon exit of the plastic melt 35 out of the nozzle gap 44 and in applying this plastic tube 58 to the inside wall 7 of the sewer pipe 8.

A television camera 59 and a lighting unit 60 may also be arranged on the supporting arm 55 or the partition 56.

A feed opening 61 for a plastic tape 62 is provided adjacent to the transmission 2 in the housing 26 of the extruder 1, as can be seen from FIG. 4. Controlled supply of the plastic tape 62 takes place through a pair of driving rollers 63. The driving rollers 63 are driven by the transmission 2 over a corresponding branch in a manner not shown. The tape 62 itself has a fluted surface for reliable supply of the tape 62. The driving rollers 63, too, are correspondingly fluted. So as to prevent dirt particles or the like from entering the extruder 1, sealing deflectors 64 are arranged in the feed opening 61 to rest against the plastic tape 62. The screw elements 29 are formed as cutting screws with sharp-edged teeth 65 in the screw feed area, i.e. downstream of the feed opening 61.

Alternately, the plastic material can be supplied to the feed opening 61 as granules, the conveying medium then being pressurized air, i.e. pneumatic granule conveyance would be used. In this case the pressurized air would escape due to reverse degasification in the portion ahead of the bearing 30, while the granules would be supplied to the screw shafts 28, 28' with the screw elements 29.

The described apparatus is used—as already mentioned—to line a damaged sewer pipe 8, i.e. for so-called sewer pipe relining. Such a sewer pipe 8 has been placed into the soil 66. An inspection pit 67 leading to the surface 68 of the earth is to be seen in FIG. 1 on the left. A joining pipe 69 opening into the sewer pipe 8 is shown in FIG. 1 on the right; it may lead to a house or branch off into a street. Three leakages are further shown in the drawing, namely a break 70, a misalignment 71 and cracks 72.

For introduction of the apparatus into the sewer pipe 8—if the inspection pit 67 is too narrow—the nozzle 11 forming a unit with the partition 56, the television camera 59 and the lighting unit 60, the extruder 1 forming another unit with the transmission 2, the driving motor 3 as another unit, and finally the feed unit 9 can each be entered individually. They are then coupled together prior to or during introduction into the sewer pipe 8. Several supply lines are piloted from the surface 68 of the earth through the inspection pit 67. They are a supply line 73 for current, a supply line 74 for pressurized air, a supply line 75 for thermo oil, a supply line 76 for hydraulic oil and a supply line 77 for water. Further, control lines 78 and the plastic tape 62 are supplied. All these supply lines 73 to 77, the control line 78 and the plastic tape 62 are coiled up on drums 79, from which they are supplied or onto which they are wound up again. These drums 79 are located in a container vehicle 80, which can be moved by means of a truck 81. A crane 82 is also located in this container vehicle 80, by means of which the nozzle 11, the extruder 1, the transmission 2, the driving motor 3 and the feed unit 9 can be lowered through the inspection pit 67 and lifted up again through the latter. Corresponding hooks 83 are to this effect provided on the mentioned components. The container vehicle 80 has a bottom opening 84 to be arranged over the inspection pit 67.

A survey of the interior of the sewer pipe 8 can be obtained with the apparatus by its being moved in the operating direction 4 through the sewer pipe 8—without the extruder 1 being put into operation. A shooting of the entire sewer pipe 8 is then made by the television camera 59. When the apparatus is moved to the starting point, i.e. when it is entered into the sewer pipe 8 against the operating direction 4, the sewer pipe can be cleaned by means of high-pressure water jetted through the nozzles 53, whereby damages such as breaks 70, misalignment 71 or cracks 72 that might not or only hardly have been visible are uncovered simultaneously.

For subsequent lining of the sewer pipe 8 the apparatus is brought into a starting position again against the operating direction 4. The plastic tape 62 has before been threaded into the extruder 1. During displacement in the operating direction 4—the screw shafts 28, 28' being correspondingly driven by the driving motor 3—a thermoplastic tube 58 is extruded from the radial nozzle 11 and rests against the inside wall 7 of the sewer pipe 8. Hot air is blown against the inside wall 7 of the sewer pipe 8 by way of hot-air nozzles 85 advancing the nozzle gap 44 in the operating direction 4, whereby the sewer pipe 8 is pre-dried and pre-heated, adhesion of the plastic tube 58 to the inside wall 7 thus being facilitated. Furthermore, additional nozzles not illustrated can be provided between the hot-air nozzles 85 and the nozzle gap 44, through which an adhesive agent or an agent improving adhesion is sprayed onto the inside wall 7 to improve and to facilitate the adhesion of the plastic tube 58.

Hot air or, alternately, water is blown or sprayed, respectively, at high pressure against the internal surface 86 of the plastic tube 58 through the pipe-moulding and cooling nozzles 53, whereby the plastic tube 58 is pressed against the inside wall 7 of the sewer pipe 8. It is thus simultaneously cooled down, as a result of which it solidifies to form a pipe 57 lining the sewer pipe 8.

When the apparatus passes a branch, such as the joining pipe (see FIG. 1), the nozzle gap 44 can partially be closed for a short time by corresponding individual adjustment of the nozzle segments 46, so that no plastic tube is extruded in this area. As a result, a clearance of this branch is not necessary. At a break 70 the nozzle segments 46 associated with the latter can be set such that the nozzle gap 44 is widened in this area. Additional plastic material is pressed out of the nozzle gap 44 at this place, a thickening 87 of the plastic tube 58 and thus of the lining pipe 57 there resulting. Apart from that the width a of the nozzle gap 44 on the whole can be set by adjustment of the nozzle segments 46, whereby the wall thickness b of the lining pipe 57 is in turn defined. The speed of displacement of the extruder 1 must of course conform to the exiting speed of the plastic tube 58 from the nozzle gap 44.

When path tracers 88 are arranged on the housing 37 of the nozzle 11 distributed over its circumference and acting radially referred to the axis 12, then breaks 70, misalignment 71 or cracks 72 can be precisely localised, which can then be used for automatic control of the positioning device 47 for the nozzle segments 46.

The partition 56 has the effect that the pipe 57 has an almost even inside wall 89 with an approximately uniform diameter c. The operational result is continuously screened by the television camera 59. As seen in FIG. 6, the lining of the sewer pipe 8 with a lining pipe 57 may take place while the sewer pipe 8 is in use as usual. A sewage hold-up 90 will then occur behind the partition 56.

What is claimed is:

1. An apparatus for lining an inside wall (7) of a sewer pipe (8), wherein an extruder (1) with a central longitudinal axis (12) is provided, which extruder (1) fits inside said sewer pipe (8), is moved therealong in an operation direction (4) by means of a feed unit (9) operatively connected thereto and has a nozzle (11) radially directed with respect to said central longitudinal axis (12), which nozzle (11) is connected to the extruder by a channel for molten plastics and includes means for extrusion of a plastic tube (58), and wherein at least one hot-air nozzle (85) is directed outwardly of said apparatus to direct air towards the inside wall (7) of the sewer pipe (8), which hot-air nozzle (85) is arranged upstream of said nozzle (11).

2. An apparatus according to claim 1, wherein the extruder (1) is provided with rollers (6) for displacement in a sewer pipe (8) and wherein the feed unit (9) is formed to be independent of and to be coupled to the extruder (1).

3. An apparatus according to claim 2, wherein the feed unit (9) is formed to have drivable moving devices (14) adapted to support themselves on the inside wall (7) of the sewer pipe (8).

4. An apparatus according to claim 3, wherein the moving devices (14) are adjustable radially in relation to the axis (12).

5. An apparatus according to claim 3, wherein each moving device (14) is supported radially with respect to said central longitudinal axis (12) against a housing (37) by way of at least one spring (22), which spring (22) is arranged between said housing (37) and a moving device (14).

6. An apparatus according to claim 3, wherein the moving devices (14) are motor-drivable.

7. An apparatus according to claim 3, wherein the moving devices are crawler tracks (14).

8. An apparatus according to claim 1, wherein at least one radial pipe molding and cooling nozzle (53) is arranged downstream of the nozzle (11), which pipe molding and cooling nozzle (53) is directed to an inside of said plastic tube (58) formed by said apparatus to charge said inside of said plastic tube (58) with a high pressure cooling medium.

9. An apparatus according to claim 8, wherein the at least one pipe moulding and cooling nozzle (53) is connected to a supply for a high-pressure medium.

10. An apparatus according to claim 1, wherein the nozzle (11) has an annular nozzle gap (44) adjustable in width (a) by an adjusting means.

11. An apparatus according to claim 10, wherein the nozzle gap (44) has a circumference which is adjustable in width (a) by said adjusting means in sections of said circumference.

12. An apparatus according to claim 1, wherein the extruder (1) has a feed opening (61) matching a plastic tape (62) to be fed into said extruder (1) and to be melted in said extruder (1).

13. An apparatus according to claim 12, wherein the extruder (1) has screw elements (29) with cutting teeth (65) adapted to cut said plastic tape (62) fed into said extruder (1).

14. An apparatus according to claim 1, wherein a detachable driving-motor unit (3) is coupled to the extruder (1).

15. An apparatus according to claim 1, wherein the nozzle (11) is provided with a closing device (46).

16. An apparatus according to claim 1, wherein a static mixer (34) is provided within said channel between the extruder (1) and the nozzle (11).

17. An apparatus according to claim 16, wherein the static mixer (34) is arranged in a plastic melt pipe (33) connecting the extruder (1) with the nozzle (11) and with which an articulated pipe coupling (36) is associated.

18. An apparatus for lining an inside wall (7) of a sewer pipe (8), wherein an extruder (1) with a central longitudinal axis (12) is provided, which extruder (1) fits inside said sewer pipe (8), is moved therealong in an operation direction (4) by means of a feed unit (9) operatively connected thereto and has a nozzle (11) radially directed with respect to said central longitudinal axis (12), which nozzle (11) is connected to the extruder (1) by a channel for molten plastics and includes means for extrusion of a plastic tube (58) and wherein at least one radial pipe molding and cooling nozzle (53) is arranged downstream of the nozzle (11), which pipe molding and cooling nozzle (53) is directed to an inside of said plastic tube (58) formed by said apparatus to charge said inside with a high pressure cooling medium.

* * * * *